(12) United States Patent
Hangsleben

(10) Patent No.: US 10,085,126 B2
(45) Date of Patent: Sep. 25, 2018

(54) INMATE TEXT COMMUNICATION VIA WI-FI RADIO

(71) Applicant: Dave W. Hangsleben, Las Vegas, NV (US)

(72) Inventor: Dave W. Hangsleben, Las Vegas, NV (US)

(73) Assignee: Hank Technology LLC, Grand Forks, ND (US)

( * ) Notice: Subject to any disclaimer, the term of this patent is extended or adjusted under 35 U.S.C. 154(b) by 21 days.

(21) Appl. No.: 15/478,589

(22) Filed: Apr. 4, 2017

(65) Prior Publication Data

US 2018/0139589 A1    May 17, 2018

Related U.S. Application Data

(60) Provisional application No. 62/497,278, filed on Nov. 15, 2016.

(51) Int. Cl.
| | |
|---|---|
| *H04W 4/14* | (2009.01) |
| *H04M 1/725* | (2006.01) |
| *H04M 3/22* | (2006.01) |
| *H04M 15/00* | (2006.01) |
| *H04M 17/00* | (2006.01) |
| *H04W 84/12* | (2009.01) |

(52) U.S. Cl.
CPC ........ *H04W 4/14* (2013.01); *H04M 1/72577* (2013.01); *H04M 3/2281* (2013.01); *H04M 15/8221* (2013.01); *H04M 17/206* (2013.01); *H04M 2203/6018* (2013.01); *H04W 84/12* (2013.01)

(58) Field of Classification Search
CPC ........ H04W 4/14; H04W 76/022; H04L 51/12
See application file for complete search history.

(56) References Cited

U.S. PATENT DOCUMENTS

| | | | |
|---|---|---|---|
| 8,295,864 B2 | 10/2012 | Samaha | |
| 9,479,651 B1* | 10/2016 | Welker-Muraguri | ........................ H04M 3/2281 |
| 2015/0215254 A1* | 7/2015 | Bennett | ................... H04L 51/12 709/206 |
| 2016/0373382 A1 | 12/2016 | Reed | |
| 2017/0055302 A1* | 2/2017 | Wang | ................... H04W 48/16 |

\* cited by examiner

*Primary Examiner* — Myron K Wyche
(74) *Attorney, Agent, or Firm* — Brooks, Cameron & Huebsch, PLLC

(57) ABSTRACT

Inmate text communication can include communicating a text message through a server via a Wi-Fi radio, where the Wi-Fi radio is associated with an active predetermined and unique telephone number selected from a group of reserved predetermined and unique telephone numbers.

20 Claims, 7 Drawing Sheets

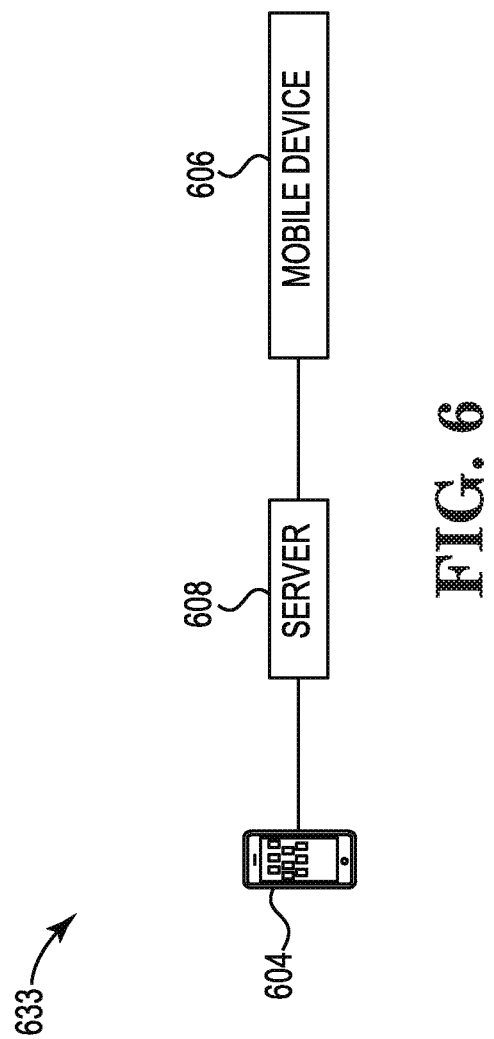

730 —

734 — COMMUNICATING, VIA A SERVER, A TEXT MESSAGE BETWEEN A WI-FI RADIO OF THE INMATE MESSAGING DEVICE AND A MOBILE DEVICE WITHOUT USE OF A CELLULAR RADIO BY THE INMATE MESSAGING DEVICE, WHEREIN THE WI-FI RADIO OF THE INMATE MESSAGING DEVICE IS ASSOCIATED WITH AN ACTIVE PREDETERMINED AND UNIQUE TELEPHONE NUMBER SELECTED FROM A GROUP OF RESERVED PREDETERMINED AND UNIQUE TELEPHONE NUMBERS

FIG. 7

INMATE TEXT COMMUNICATION VIA WI-FI RADIO

CROSS-REFERENCE TO RELATED APPLICATIONS

This application claims priority to U.S. Provisional Application 62/497,278 filed Nov. 15, 2016, which is incorporated by reference.

BACKGROUND

Communications can enable inmates housed in penal institutions, such as incarceration and/or correctional facilities, to interact with friends, family, and/or others. For example, a communication can permit a visitor to interact with an inmate housed in penal institution while the visitor is at the penal institution and/or while the visitor is remotely located from the penal institution. Such communications may have security considerations and/or privacy considerations, among other considerations associated therewith.

BRIEF DESCRIPTION OF THE DRAWINGS

FIG. 6 illustrates an example of a system for inmate text communication via Wi-Fi radio consistent with the disclosure.

FIG. 7 illustrates an example of a method for inmate text communication via Wi-Fi radio consistent with the disclosure.

DETAILED DESCRIPTION

Communication between inmates and others, such as friends and/or family members, can occur in person, such as when a friend, family member, or other person visits an inmate at a penal institution, or remotely, via telephone, electronic mail (email), or other mechanisms. Penal institutions, such as incarceration and/or correctional facilities, refer to a location(s) including prisons and/or jails, among other types of incarceration facilities, which house inmates. An inmate refers to an incarcerated person, for instance, those in an incarceration facility. An incarceration facility such as a prison, may, for example, allow a communication between an inmate of the prison and a customer. A customer can refer to a family member, significant other, friend, and/or legal representative of an inmate that communicates with an inmate, among other customers that may communicate with an inmate.

Allowing communication between inmates and customers can be desirable for incarceration facilities. For instance, allowing communication between an inmate and a family member may promote good behavior by the inmate from the perspective of the incarceration facility. However, allowing an inmate to communicate with customers in some circumstances may be detrimental, such as when an inmate may be furthering criminal activity by communicating with a customer.

It can be desirable to provide an inmate with a way to communicate with customers while discouraging further criminal activity. For instance, providing inmates access to telephones and/or electronic mail can allow an inmate to communicate with a customer while allowing, when legally permissible, incarceration facility staff, law enforcement, and/or legal counsel, among others, to monitor, record, and/or review those communications. However, inmate access to these methods of communication may be limited, for instance, by time, as other inmates may be waiting to use telephones or email. Further, an inmate may not have their desired level of privacy as other inmates may be waiting in proximity to use telephones or email.

In contrast, examples of the present disclosure include methods, systems, and computer-readable and executable instructions for text communication via Wi-Fi radio, as is described herein. An inmate can, for example, be assigned an inmate messaging device with text communication capabilities. The inmate may carry the inmate messaging device with them during certain times of the day, and may communicate (e.g., send and/or receive) text communications via a Wi-Fi radio included with the inmate messaging device at their leisure. Where permissible, the text communications may be reviewable by incarceration facility staff, law enforcement, and/or legal counsel, among others. In this manner, text communication via Wi-Fi radio can provide inmates with a way to communicate with customers while maintaining a degree of privacy from other inmates, which can promote positive inmate behavior.

Figure 1:
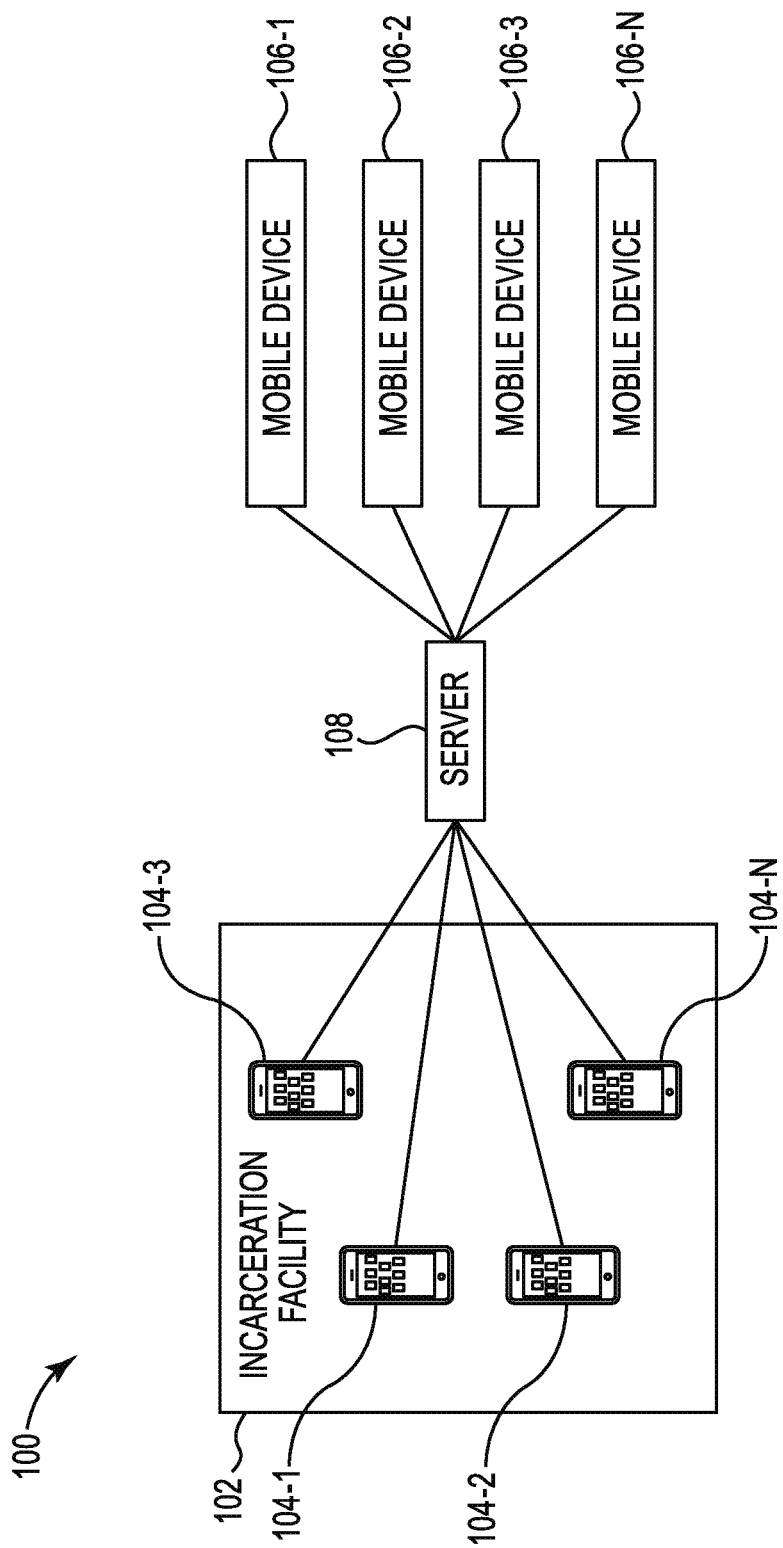
FIG. 1 illustrates an example of a system for inmate text communication via Wi-Fi radio consistent with the disclosure.

FIG. 1 illustrates an example of a system 100 for inmate text communication via Wi-Fi radio consistent with the disclosure. As shown in FIG. 1, system 100 includes an incarceration facility 102, inmate messaging devices 104-1, 104-2, 104-3, 104-N (referred to collectively as inmate messaging devices 104), mobile devices 106-1, 106-2, 106-3, 106-N (referred to collectively as mobile devices 106), and server 108.

Inmate messaging devices 104, such as inmate messaging device 104-1, can display a keyboard on a user interface of the inmate messaging device 104-1. For example, inmate messaging device 104-1 can display a QWERTY keyboard such that a user of inmate messaging device 104-1 can input text or other inputs to inmate messaging device 104-1. As used herein, a QWERTY keyboard refers to a keyboard layout in which the first six keys of the top left letter row are QWERTY.

Although inmate messaging devices 104 are described as displaying a QWERTY keyboard, examples of the disclosure are not so limited. For example, inmate messaging device 104 can display any other keyboard layout.

Inmate messaging devices 104 represent electronic devices that can generate and/or receive electronic data and/or facilitate text communication via Wi-Fi radio, among other capabilities. Examples of inmate messaging devices 104 can include inmate messaging device including a capability to wirelessly transmit data, such as text messages, via a Wi-Fi radio.

Each inmate messaging device 104 can include a Wi-Fi radio. As used herein, the term "Wi-Fi radio" can, for example, refer to a radio including an antenna capable of transmitting and/or receiving data according to the Institute of Electrical and Electronics Engineers (IEEE) 802.11 standard. As used herein, the term "antenna" can, for example, refer to a device that converts electric power into radio waves, and/or vice versa.

Inmate messaging devices 104 can communicate a text message with mobile devices 106 via the Wi-Fi radios of each inmate messaging device 104. A text message can include a short message service (SMS) message and/or a multimedia messaging service (MMS) message. As used herein, the term "SMS message" can, for example, refer to a text messaging service component using standardized communication protocols to enable text messages to be sent and/or received between devices. As used herein, the term "MMS message" can, for example, refer to a text messaging service component using standardized communication protocols to enable text messages that may include media content to be sent and/or received between devices.

As used herein, the term "mobile device" can, for example, refer to a device including a processing resource, memory, and input/output interfaces for wired and/or wireless communication. For example, a mobile device may include a laptop computer, a desktop computer, a phone (e.g., a smart phone), a tablet, a personal digital assistant (PDA), smart glasses, and/or a wrist-worn device (e.g., a smart watch), among other types of mobile devices, although examples of the disclosure are not limited to such devices.

An inmate can request an inmate messaging device 104 from, for example, incarceration facility staff. An inmate may be assigned an inmate messaging device 104 for text communication via a Wi-Fi radio. In order to receive the inmate messaging device 104, an inmate may have to agree to a user agreement. The user agreement can set conditions for use of inmate messaging device 104 by an inmate, including text communication limitations, funding agreements, and/or legal disclaimers.

Incarceration facility staff may input information about the inmate and/or the inmate messaging device 104 into server 108 in response to the inmate being assigned an inmate messaging device 104. For example, inmate information and/or inmate messaging device information can be stored in server 108, as is further described herein.

An inmate may be prevented from receiving an inmate messaging device 104. For example, an inmate who may have destroyed or caused an inmate messaging device 104 to be destroyed can be prevented from receiving another inmate messaging device 104. The inmate can be stored on a list of inmates not allowed to be issued inmate messaging devices 104. The list may be stored on server 108.

The Wi-Fi radio of each inmate messaging device 104 can be associated with an active predetermined and unique telephone number selected from a group of reserved predetermined and unique telephone numbers. For example, a group of telephone numbers may be reserved such that they may be assigned to inmate messaging devices 104, where the inmate messaging devices 104 are assigned to inmates at incarceration facility 102.

Each respective telephone number of the group of reserved predetermined and unique telephone numbers can be a North American Numbering Plan number. The Wi-Fi radio of each inmate messaging device 104 can be associated with unique telephone numbers that can include a numbering plan area code, central office exchange code, and a subscriber number. For example, the Wi-Fi radio of inmate messaging device 104-1 can have an active predetermined and unique telephone number that is 999-555-1001, and the Wi-Fi radio of inmate messaging device 104-2 can have an active predetermined and unique telephone number that is 999-555-1515.

The group of reserved predetermined and unique telephone numbers can include a numbering plan area code associated with an area including incarceration facility 102. For example, the area code of the group of reserved predetermined and unique telephone numbers can be an area code associated with a geographic area including incarceration facility 102. As an example, each respective telephone number included in the group of reserved predetermined and unique telephone numbers can include the area code "999".

The active predetermined and unique telephone number of each inmate messaging device 104 can be associated with a user of each inmate messaging device 104. That is, inmate messaging devices 104 can be assigned to inmates, and an active predetermined and unique telephone number of each assigned inmate messaging device 104 can be associated with an inmate assigned the specific inmate messaging device 104. For example, inmate "John Doe" may be assigned inmate messaging device 104-1, where the Wi-Fi radio of inmate messaging device 104-1 is associated with the active predetermined and unique telephone number 999-555-1001. Using this active predetermined and unique telephone number, a customer utilizing a mobile device such as mobile device 106-1 can send a text message to 999-555-1001, and inmate "John Doe" may receive the text message via inmate messaging device 104-1, as is further described herein.

Inmate messaging devices 104 do not include a cellular radio. Stated differently, each inmate device of the inmate messaging devices 104 does not include a cellular radio. As used herein, the term "cellular radio" can, for example, refer to a radio including an antenna capable of transmitting and/or receiving data according to standards for cellular networks, such as Global System for Mobile Communications (GSM) standards and/or Code division multiple access (CDMA) standards, among other standards for cellular networks. For example, inmate messaging devices 104 do not include a cellular radio and as such, are not able to communicate on GSM or CDMA cellular networks, among other types of cellular networks. The lack of a cellular radio may be desirable to prohibit an inmate from making a telephone call and/or sending text messages via a GSM and/or CDMA cellular network.

Inmate messaging devices 104 can communicate the text message via the Internet. That is, each inmate messaging device 104 can communicate a text message via the Wi-Fi radio of each inmate messaging device 104 in accordance with the IEEE 802.11 standard. For example, incarceration facility 102 can include a wireless local area network (WLAN) that can include at least one access point (AP) (not shown in FIG. 1). Inmate messaging devices 104 can communicate with the server 108 using the Internet via the AP and WLAN.

An AP can refer to a networking device that allows a client device (e.g., an inmate messaging device) to connect to a wired or wireless network. As used herein, the term "access point" (AP) can, for example, refer to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include a memory resource, including read-write memory, and a hierarchy of persistent memory such as ROM, EPROM, and/or Flash memory.

As used herein, the term "wireless local area network" (WLAN) can, for example, refer to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

The inmate messaging devices 104 can communicate a text message via the Wi-Fi radio of inmate messaging devices 104 utilizing an AP and a WLAN of incarceration facility 102. That is, the Wi-Fi radio of inmate messaging devices 104 can communicate text messages through the AP and WLAN of incarceration facility 102, via server 108, with mobile devices 106.

Inmate messaging devices 104 can send a text message to mobile devices 106 and/or receive a text message from mobile devices 106. For example, the Wi-Fi radio of inmate messaging device 104-1 can send, through the AP and WLAN of incarceration facility 102, via server 108, a text message to mobile device 106-1. Inmate messaging device 104-1 can receive, via server 108 and through the AP and WLAN of incarceration facility 102, a text message from mobile device 106-1. Inmate messaging device 104-1 can send the text message to mobile device 106-1 using the unique telephone number associated with mobile device 106-1, and mobile device 106-1 can send the text message to inmate messaging device 104-1 using the active predetermined and unique phone number assigned to inmate messaging device 104-1 (e.g., 999-555-1001), described above.

Although server 108 is shown in FIG. 1 as being remote from incarceration facility 102, examples of the disclosure are not so limited. For example, server 108 can be located at incarceration facility 102.

Server 108 can prevent communication of a text message in response to a telephone number of the mobile device 106 being included in a list of restricted mobile devices. Inmate messaging device 104 may be restricted from communicating text messages to certain mobile devices. In some examples, an inmate may be restricted from communicating with mobile devices of witnesses, victims, opposing legal counsel, and/or judges, among others. In some examples, an inmate may be restricted from communicating with inmate messaging devices associated with other inmates, where the inmate messaging devices may be associated with other inmates at incarceration facility 102 or associated with other inmates at other incarceration facilities. For instance, an inmate using inmate messaging device 104-1 may try to communicate a text message to a mobile device 106-1 with a telephone number included in the list of restricted mobile devices. The text message sent by inmate messaging device 104-1 via the Wi-Fi radio of inmate messaging device 104-1 can be sent, through the AP and WLAN of incarceration facility 102, to server 108, where server 108 prevents the text message from being communicated to mobile device 106-1.

Server 108 may store a list of restricted mobile devices. The list can include telephone numbers associated with restricted mobile devices. For example, if an inmate attempts to send a text message to a mobile device included in the restricted list of mobile devices, server 108 can prevent the delivery of the text message from the inmate messaging device 104 of the inmate to the mobile device included in the list of restricted mobile devices. Notably, even messages prevented from delivery can be stored, for example, in server 108 or otherwise, to permit access to communication information (e.g., content of a text message) of the prevented messages to incarceration facility staff, law enforcement, and/or legal counsel, among others that may review such messages even though such messages are prevented from delivery to the inmate messaging device 104.

Server 108 can store communication information corresponding to text messages communicated by inmate messaging devices 104 and/or communication information of messages prevented from delivery to the inmate messaging device 104. For example, a text message can include information including the text of the text message, the telephone number of the mobile device 106 the text message is communicated to and/or from, and/or inmate messaging device information, among other communication information, which may be saved by server 108.

Communication information can include, but is not limited to, inmate information such as an inmate's name, jail identification number, and/or date of birth, inmate messaging device information such as the inmate messaging device identification number, the active predetermined and unique telephone number of the inmate messaging device 104, and/or the device password selected by the inmate, account funding information such as account balance and/or how the account balance was funded (e.g., funding transactions), and/or text message information such as messages sent, messages received, messages rejected, the content of sent/received/rejected messages, telephone numbers associated with mobile device 104 messages are sent to/received from by the inmate messaging device 104, revenue information, usage reports, among other communication information. Communication information may be stored for a predetermined and/or configurable length of time.

Communication information may be reviewed by incarceration facility staff, law enforcement, and/or legal counsel, among others, where applicable and/or legally permissible. For example, communication information stored on server 108 may be searchable and/or the communication may be exportable. The communication information may be used as investigatory and/or evidentiary material, among other purposes.

Server 108 can prevent some or all of inmate messaging devices 104 from communicating text messages at a predetermined time. Server 108 can prevent communication of text messages to and/or from inmate messaging devices 104 at various scheduled times. For example, server 108 can prevent communication of text messages during predetermined time periods, such as during inmate transfers, at night, etc. For instance, an inmate using inmate messaging device 104-1 may try to communicate a text message to mobile device 106-1 during the predetermined time when communication of text messages is prevented/prohibited. The text message sent by inmate messaging device 104-1 via the Wi-Fi radio of inmate messaging device 104-1 can be sent, through the AP and WLAN of incarceration facility 102, to server 108, where server 108 prevents the text message from being communicated to mobile device 106-1. Server 108 can prevent communication of a text message from mobile devices 106 to inmate messaging devices 104 in the same manner.

Server 108 can monitor and/or log usage information of inmate messaging devices 104. For instance, each inmate messaging device 104 may be assigned an equipment number, and server 108 can monitor and/or log usage information of each inmate messaging device 104 based on the inmate messaging device equipment numbers. For example, server 108 can monitor and/or log battery levels of each inmate messaging device 104. In an example in which server 108 is unable to monitor and/or log usage information of inmate messaging device 104-1, incarceration facility staff or others may be able to determine whether the battery of inmate messaging device 104-1 has been discharged, or if inmate messaging device 104-1 has been taken off the premises of incarceration facility 102.

Inmate messaging devices 104 can operate in a single application mode when communicating a text message via the Wi-Fi radio. As used herein, the term "single application mode" can, for example, refer to a mode of operation of inmate messaging devices 104 in which interaction and control of functions of inmate messaging devices 104 other than communication of text messages are disabled. That is, inmate messaging devices 104 may be restricted to communication of text messages by inmates.

Inmate messaging device 104 can communicate a text message in response to an account associated with the inmate messaging device 104 having a sufficient monetary balance. That is, there can be a monetary cost associated with each text message sent and/or each text message received. When an inmate is assigned an inmate messaging device 104 (e.g., inmate messaging device 104-1), an account is associated with the inmate messaging device 104 linked to an active predetermined and unique telephone number. Each inmate messaging device 104 can have an account associated with the inmate messaging device 104 that may be funded by various mechanisms so that an inmate can send and/or receive text messages, as is described herein. If there is an insufficient monetary balance in an account associated with an inmate messaging device 104, inmate messaging device 104 may not send a text message or receive a text message.

For example, each text message that is sent by inmate messaging device 104-1 can cost $0.09, and each text message that is received by an inmate messaging device 104-1 can cost $0.09. Hence, $0.09 can be subtracted from the account balance for inmate messaging device 104-1 each time a text message is sent from inmate messaging device 104-1, and $0.09 can be subtracted from the account balance for inmate messaging device 104-1 each time a text message is received or opened from inmate messaging device 104-1. In an instance where the account associated with inmate messaging device 104-1 has less than $0.09 available, inmate messaging device 104-1 may not be able to communicate a text message.

Although the cost for communicating a text message by inmate messaging devices 104 is described above as being $0.09 per communication, examples of the disclosure are not so limited. For instance, the cost for communicating a text message can be configurable (e.g., the cost can be more or less than $0.09 per communication).

In some examples, an inmate may have to pay a rental fee to be assigned an inmate messaging device 104. The rental fee may be a periodic fee (e.g., monthly), such as $4 per month, although examples of the disclosure are not limited to a $4 rental fee per month. For instance, the rental fee can be configurable (e.g., the rental fee can be higher or lower than $4 per month). In some examples, the rental fee may be a one-time fee.

An account associated with an inmate messaging device 104 may be funded by receiving, via a user interface of the inmate messaging device 104, funding via a funding mechanism. For example, an inmate or a customer may purchase a telephone card, and may input payment information from the telephone card into inmate messaging device 104-1 via the user interface of inmate messaging device 104-1 to fund the account associated with inmate messaging device 104-1. As used herein, the term "telephone card" can, for example, refer to a card having a monetary stored-value system, which can be accessible via an access telephone number and a personal identification number (PIN), where the card may or may not be a physical card.

An account associated with an inmate messaging device 104 may be funded by communicating, via a Wi-Fi radio of an inmate messaging device 104, a predefined funding request text message to a mobile device 106. The predefined funding request text message can be a preprogrammed text message that can be sent to a mobile device 106 of a customer, where the preprogrammed text message can direct the customer to a web site (e.g., via a web link) to fund the account associated with the inmate messaging device 104 sending the predefined funding request text message. As an example, a predefined funding request text message may say "An account associated with inmate John Doe is out of funds. Please visit [web link] to fund the account associated with John Doe's inmate messaging device. Demo County Jail." Once a customer has funded the account associated with the inmate messaging device 104, the inmate may be able to communicate text messages.

An inmate may send a predefined amount of predefined funding request text messages per day. For example, an inmate with inmate messaging device 104-1 may send five predefined funding request text messages to various mobile devices 106 per day. The amount of predefined funding request text messages per day may be configurable (e.g., there can be more than five or less than five predefined funding request text messages per day), such as by incarceration facility staff or others.

Inmate text communication via Wi-Fi radio, according to the disclosure, can allow for inmates to communicate with customers while incarcerated using an inmate messaging device with a Wi-Fi radio. The inmate can carry the inmate messaging device with them and send and/or receive text communications at their leisure. Inmates can keep in contact with friends and family members while maintaining a degree of privacy with respect to other inmates as to their communications. This can allow inmates to send information to customers, such as general correspondence, court dates, fines, release dates, scheduling visitation, phone call times, etc. Allowing inmates text communication privileges can keep inmates busy, which can reduce problems arising from boredom, such as complaints, arguments, and/or altercations between inmates and/or incarceration facility staff. Allowing inmates to stay in contact with customers can decrease recidivism rates once an inmate is released.

Inmate text communication via Wi-Fi radio can, according to the disclosure, provide benefits to incarceration facility staff, law enforcement and/or legal counsel. For example, incidents between inmates may be reduced. Text messages and other information can be easily reviewable by law enforcement and/or others, which may be used for evidentiary or other purposes.

Figure 2:
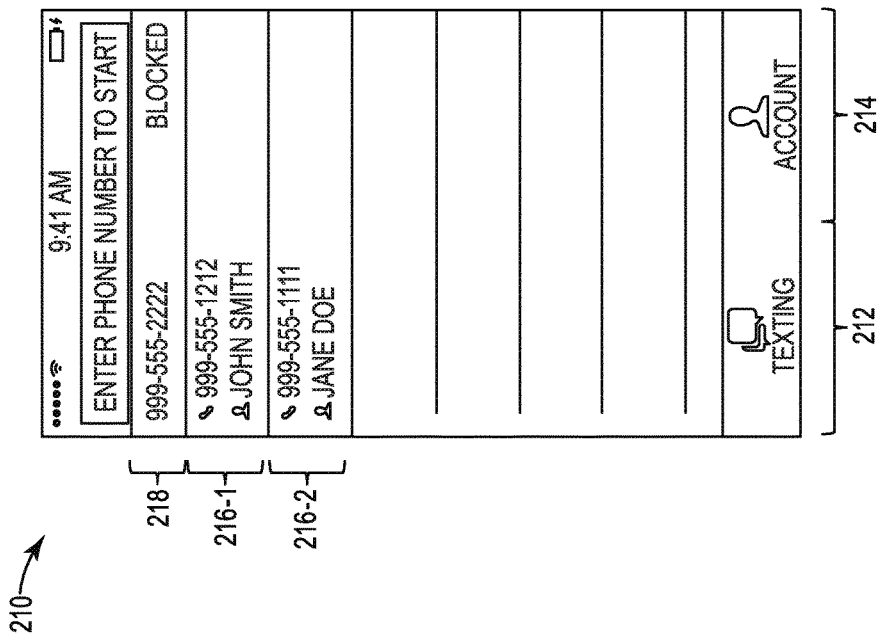
FIG. 2 illustrates an example of a display of a user interface for inmate text communication via Wi-Fi radio consistent with the disclosure.

FIG. 2 illustrates an example of a display of a user interface 210 for inmate text communication via Wi-Fi radio consistent with the disclosure. As shown in FIG. 2, the user interface 210 can include text message access 212, account access 214, contacts 216-1 and 216-2, and blocked contact 218.

User interface 210 can include text message access 212. As shown in FIG. 2, text message access 212 can display text message conversations. For example, an inmate utilizing an inmate messaging device (e.g., inmate messaging device 104, previously described in connection with FIG. 1) displaying user interface 210 may have two text message conversations with contacts 216-1 and 216-2. Contact 216-1 may be a customer by the name "John Smith" who has a mobile device (e.g., mobile device 106, previously described in connection with FIG. 1) with the associated telephone number "999-555-1212". Similarly, contact 216-2 may be a customer by the name "Jane Doe" who has a mobile device with the associated telephone number "999-555-1111".

The inmate may communicate text messages with contacts 216-1 and/or 216-2 using the inmate messaging device. For example, the inmate may select contact 216-1 to send and/or receive a text message from John Smith. The selection of John Smith, by the inmate via user interface 210, can generate a window (not shown) that can display previously sent and/or received text messages, as well as a keyboard allowing the inmate to input, via user interface 210, text to be sent as a text message.

The inmate messaging device can reject a text message sent from a mobile device to the inmate messaging device in response to an input to the inmate messaging device. As described in connection with FIG. 1, a monetary cost can be incurred by communicating a text message with a mobile device. For instance, an inmate may receive a text message, and incur a cost when opening the received text message to view the contents of the text message. In some instances, a customer may send text messages to an inmate that the inmate may not want to see, and correspondingly, may not want to pay for. Prior to incurring the monetary cost for the received text message, an inmate can reject the received text message via a user input to the user interface 210 of the inmate messaging device.

For example, the inmate can select an option (not shown) to reject the received text message prior to opening the received text message to view the contents of the text message. By so doing, the inmate may avoid the cost of the received text message. In some examples, the contents of the rejected text message can simply not be displayed on user interface 210. In some examples, the rejected text message can be removed from the inmate messaging device, in order to prevent an inmate from accidentally opening a rejected text message and incurring a monetary cost. In both of the above examples, the contents of the rejected text message can be saved on a server (e.g., server 108, previously described in connection with FIG. 1) for review regardless of the action taken by the inmate.

The inmate messaging device can accept a text message sent from a mobile device to the inmate messaging device in response to an input to the inmate messaging device. For example, an inmate may receive a text message from, for instance, contact 216-1. An icon (not shown) may indicate a new text message from contact 216-1, and an inmate can accept the text message sent from the mobile device of contact 216-1 by selecting the icon to open the new text message from contact 216-1. Opening the new text message to view the contents of the text message can incur a cost for communicating a text message.

The inmate messaging device can block a mobile device from communicating future text messages in response to a user input. For example, an inmate can block certain mobile devices from communicating text messages with the inmate messaging device. For instance, as shown in FIG. 2, user interface 210 indicates that blocked contact 218 has been blocked by the inmate from communicating text messages to the inmate. By blocking a mobile device, the inmate has effectively prevented the mobile device with associated telephone number "999-555-2222" from communicating text messages with the inmate's messaging device. Text messages sent from the blocked mobile device can be saved in a server (e.g., for review), but may not be received by the inmate messaging device and accordingly, not incur a monetary cost for the inmate.

Although not shown in FIG. 2, in some examples the user interface 210 can display an amount of text messages left that can be communicated according to the monetary balance in the account associated with the inmate messaging device. Display of the amount of text messages that can be communicated can allow an inmate to easily determine how many text messages may be sent and/or received according to their monetary balance in their account. The inmate can plan accordingly to send and/or receive more important text messages, and/or know to provide additional funding to the account associated with the inmate messaging device.

User interface 210 can include account access 214. An inmate can access account information via account access 214, where an inmate can view monetary account and/or balance information, add funds, etc., as is further described in connection with FIG. 4.

Figure 3:
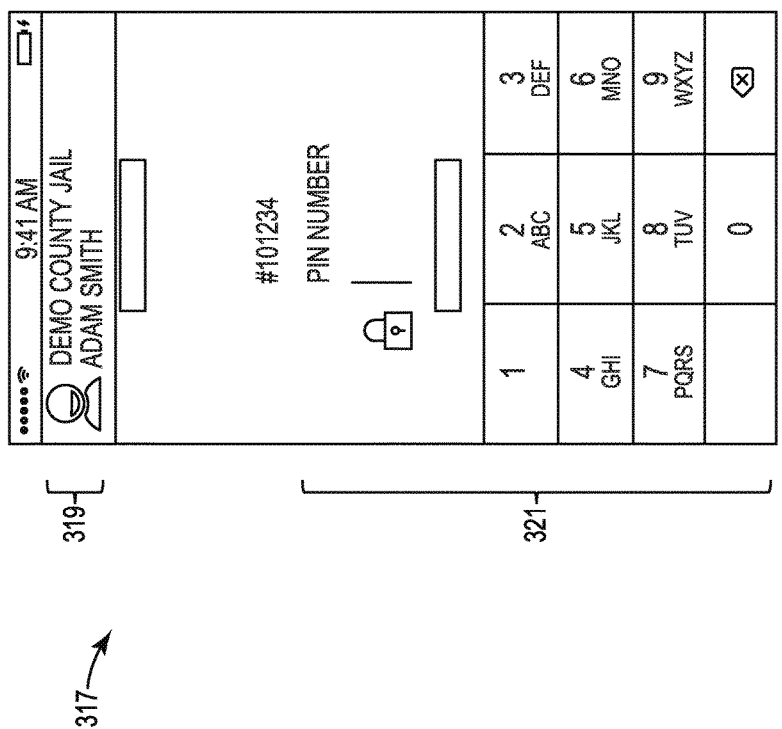
FIG. 3 illustrates an example of a display of a user interface for inmate text communication via Wi-Fi radio consistent with the disclosure.

FIG. 3 illustrates an example of a display of a user interface 317 for inmate text communication via Wi-Fi radio consistent with the disclosure. As shown in FIG. 3, the user interface 317 can include user information 319 and device password input 321.

User interface 317 can include user information 319. As shown in FIG. 3, user information 319 can include the name of the incarceration facility (e.g., incarceration facility 102, previously described in connection with FIG. 1) utilizing the inmate messaging device (e.g., inmate messaging device 104, previously described in connection with FIG. 1), as well as the name of the inmate associated with the inmate messaging device. For example, the inmate messaging device having the user interface 317 may be in use at "Demo County Jail" and assigned to inmate "Adam Smith".

The inmate messaging device can be unlocked in response to receiving a device password associated with the inmate messaging device and communicate a text message without receipt of an application level password in response to receiving, via a keyboard, an input to the inmate messaging device. For example, inmate Adam Smith may be assigned the inmate messaging device having user interface 317. Inmate Adam Smith can choose a device password, such as a PIN number, so that Adam Smith is the inmate that can communicate text messages on that inmate messaging device, while preventing other inmates from accessing Adam Smith's assigned inmate messaging device to communicate text messages. Adam Smith may access the inmate messaging device to communicate text messages by inputting, via device password input 321, Adam Smith's chosen device password.

Inmate Adam Smith may choose the device password so that other inmates may not access Adam Smith's assigned inmate messaging device. However, the chosen device password may be stored on a server such that incarceration facility staff, law enforcement, and/or legal counsel may access the inmate messaging device.

In some examples, the device password may be generated for the inmate. For example, the device password for Adam Smith's assigned inmate messaging device may be randomly generated, for instance, by incarceration facility staff.

Upon entry of the device password via device password input 321, the inmate messaging device may be utilized to send and/or receive text messages. No other passwords or other access mechanisms, such as application level passwords, may be present in order to access text message communication capabilities of the inmate messaging device.

Restricting access to inmate messaging devices via a device password can give an inmate assigned the inmate messaging device privacy from other inmates. The device password can prevent other inmates from accessing the inmate messaging device and communicating unwanted text messages, thereby preventing unwanted costs associated with text message communication for the inmate assigned the inmate messaging device.

Figure 4:
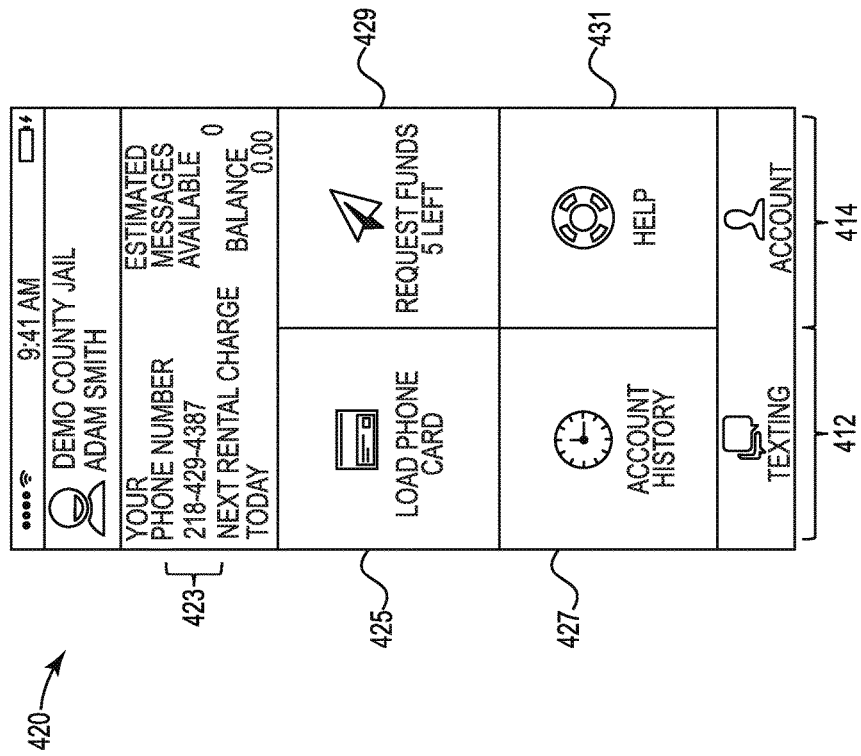
FIG. 4 illustrates an example of a display of a user interface for inmate text communication via Wi-Fi radio consistent with the disclosure.

FIG. 4 illustrates an example of a display of a user interface 420 for inmate text communication via Wi-Fi radio consistent with the disclosure. As shown in FIG. 4, the user interface 420 can include text message access 412 (e.g., text message access 212, previously described in connection with FIG. 2), account access 414 (e.g., account access 214, previously described in connection with FIG. 2), active predetermined and unique telephone number 423, load phone card 425, account history 427, request funds 429, and help 431.

User interface 420 can include active predetermined and unique telephone number 423. For example, as shown in FIG. 4, inmate "Adam Smith" can have been assigned an inmate messaging device, and the Wi-Fi radio of the inmate messaging device can have an active predetermined and unique telephone number 423 that is "218-429-4387".

User interface 420 can include load phone card 425. For example, an inmate or a customer may purchase a telephone card. Payment information from the telephone card may be input into the inmate messaging device by selecting load phone card 425. The telephone card input through load phone card 425 can fund the account associated with the inmate messaging device.

User interface 420 can include account history 427. Account history 427 can be accessed by an inmate assigned the inmate messaging device or by incarceration facility staff, law enforcement, and/or legal counsel, among others. Account history 427 can include account balance, funding transactions, messaging transactions, rental fees, credits (e.g., general credits), etc.

User interface 420 can include request funds 429. As previously described in connection with FIG. 1, an account associated with the inmate messaging device may be funded by communicating a predefined funding request text message. The inmate can select request funds 429 to cause the inmate messaging device to communicate a preprogrammed text message to direct a customer to a web site to fund the account associated with the inmate messaging device. For example, the predefined funding request text message may say "An account associated with inmate Adam Smith is out of funds. Please visit [web link] to fund the account associated with Adam Smith's inmate messaging device. Demo County Jail." As shown in FIG. 4, the user interface 420 can indicate to the inmate they have five predefined funding request text messages left to be sent for the particular time period (e.g., five predefined funding request text messages left to be sent for that day).

User interface 420 can include help 431. In some examples, an inmate may be able to access frequently asked questions regarding how to utilize the inmate messaging device for text message communication by selecting help 431. In some examples, an inmate may be able to access a support chat by selecting help 431. For instance, an inmate may be able to request help in utilizing the inmate messaging device for text message communication by utilizing a support chat, where the inmate messaging device communicates with a support chat via the server through an AP and WLAN of the incarceration facility. The support chat may be operated by incarceration facility staff or others via the server previously described in connection with FIG. 1.

An inmate utilizing inmate messaging device can switch from account access 414 to text message access 412 by selecting text message access 412. The inmate may then view and/or communicate text messages from text message access 412.

Figure 5:
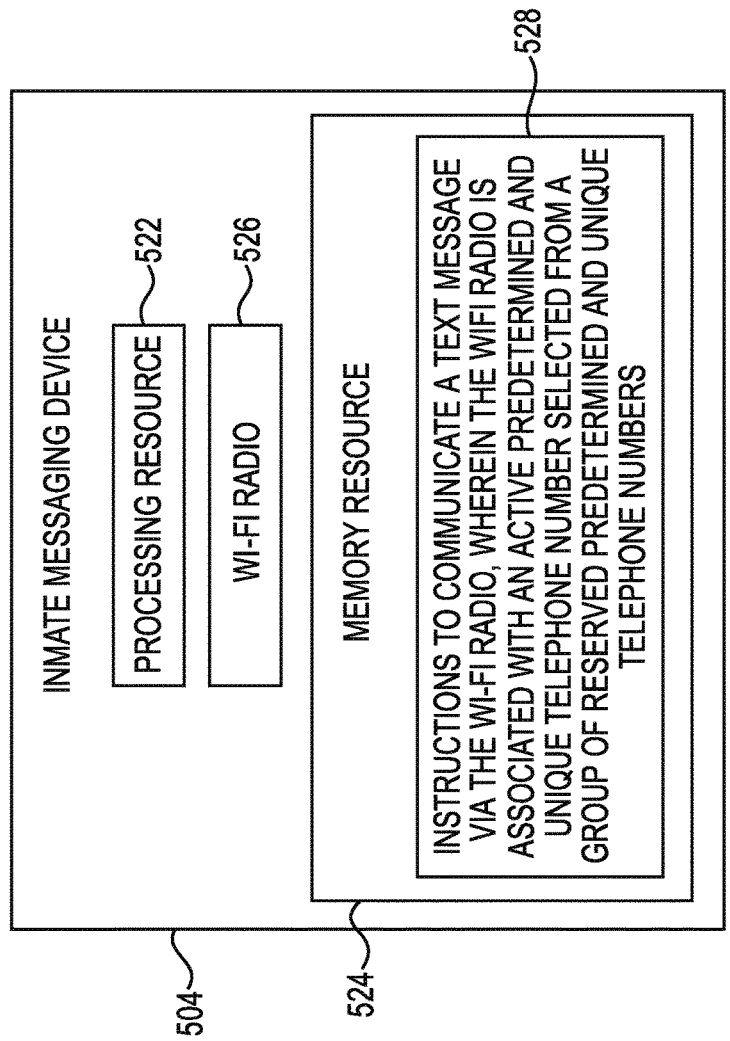
FIG. 5 illustrates a diagram of an example of an inmate messaging device suitable for inmate text communication via Wi-Fi radio consistent with the disclosure.

FIG. 5 illustrates a diagram of an example of an inmate messaging device 504 suitable for inmate text communication via Wi-Fi radio consistent with the disclosure. Inmate messaging device 504 can include a processing resource 522, a memory resource 524, and a Wi-Fi radio 526. Memory resource 524 can include machine-readable instructions, including communicate a text message via a Wi-Fi radio instructions 528.

Processing resource 522 may be a central processing unit (CPU), a semiconductor based microprocessor, and/or other hardware devices suitable for retrieval and execution of machine-readable instructions 428 stored in a memory resource 524. Processing resource 522 may fetch, decode, and execute instructions 528. As an alternative or in addition to retrieving and executing instructions 528, processing resource 522 may include a plurality of electronic circuits that include electronic components for performing the functionality of instructions 528.

Memory resource 524 may be any electronic, magnetic, optical, or other physical storage device that stores executable instructions 528 and/or data. Thus, memory resource 524 may be, for example, Random Access Memory (RAM), an Electrically-Erasable Programmable Read-Only Memory (EEPROM), a storage drive, an optical disc, and the like. Memory resource 524 may be disposed within inmate messaging device 504, as shown in FIG. 5. Additionally and/or alternatively, memory resource 524 may be a portable, external or remote storage medium, for example, that allows inmate messaging device 504 to download the instructions 528 from the portable/external/remote storage medium.

Memory resource 524 can be a non-transitory machine-readable medium. A machine readable storage medium may be any electronic, magnetic, optical, or other physical storage device that stores executable instructions. Thus, machine readable storage medium may be, for example, Random Access Memory (RAM), an Electrically-Erasable Programmable Read-Only Memory (EEPROM), a storage drive, an optical disc, and the like. The executable instructions may be "installed" on the inmate messaging device 504 illustrated in FIG. 5. The machine readable storage medium may be a portable, external or remote storage medium, for example, that allows the inmate messaging device 504 to download the instructions from the portable/external/remote storage medium. In this situation, the executable instructions may be part of an "installation package". As described herein, the machine readable storage medium may be encoded with executable instructions related to inmate text communication. That is, using processing resource 522, the machine readable storage medium may instruct an inmate messaging device 504 to communicate a text message via Wi-Fi radio 526, among other operations Processing resource 522 may execute communicate a text message via a Wi-Fi radio instructions 428 stored in memory resource 524 to communicate a text message via a Wi-Fi radio, where the Wi-Fi radio is associated with an active predetermined and unique telephone number selected from a group of reserved predetermined and unique telephone numbers.

FIG. 6 illustrates an example of a system 633 for inmate text communication via Wi-Fi radio consistent with the disclosure. As shown in FIG. 6, system 633 includes an inmate messaging device 604 (e.g., inmate messaging device 104 and 504, previously described in connection with FIGS. 1 and 5, respectively), mobile device 606 (e.g., mobile device 106, previously described in connection with FIG. 1), and server 608 (e.g., server 108, previously described in connection with FIG. 1).

Inmate messaging device 604 can include a Wi-Fi radio (e.g., Wi-Fi radio 526, previously described in connection with FIG. 5). The Wi-Fi radio can communicate a text message through server 608 with mobile device 606 via the Wi-Fi radio. For example, inmate messaging device 604 can send and/or receive a text message from mobile device 606. The text message can be sent and/or received through server 608.

The Wi-Fi radio of inmate messaging device 604 can be associated with an active predetermined and unique telephone number. The active predetermined and unique telephone number can be selected from a group of reserved predetermined and unique telephone numbers. As previously described in connection with FIG. 1, each respective telephone number of the group of reserved predetermined and unique telephone numbers can be a North American Numbering Plan number. Inmate messaging device 604 can utilize the active predetermined and unique telephone number associated with inmate messaging device 604 to send a text message to mobile device 606 through server 608, and mobile device 606 can utilize the active predetermined and unique telephone number associated with inmate messaging device 604 to send a text message to inmate messaging device 604 through server 608.

FIG. 7 illustrates an example of a method 730 for inmate text communication via Wi-Fi radio consistent with the disclosure. For example, method 730 can be performed by an inmate messaging device (e.g., inmate messaging device 104, 504, previously described in connection with FIGS. 1 and 5, respectively) and/or a server (e.g., server 108, previously described in connection with FIG. 1) to provide inmate text communication via Wi-Fi radio.

Method 730 can include displaying, by a user interface (e.g., user interface 210, 317, previously described in connection with FIGS. 2 and 3, respectively) of the inmate messaging device, a keyboard. The keyboard can be a QWERTY keyboard, and may be displayed such that an inmate may input text to be communicated as a text message.

At 734, method 730 includes communicating, via the server, a text message between a Wi-Fi radio (e.g., Wi-Fi Radio 526, previously described in connection with FIG. 5) of the inmate messaging device and a mobile device without use of a cellular radio by the inmate messaging device, where the Wi-Fi radio of the inmate messaging device is associated with an active predetermined and unique telephone number selected from a group of reserved predetermined and unique telephone numbers.

Method 730 can include sending, via the Wi-Fi radio of the inmate messaging device, communication information to the server. For example, the inmate messaging device can periodically send communication information to the server so that incarceration facility staff, law enforcement, and/or legal counsel, among other personnel, may review communication information from the inmate messaging devices. Communication information can include, but is not limited to, inmate information such as an inmate's name, jail identification number, and/or date of birth, inmate messaging device information such as the inmate messaging device identification number, the active predetermined and unique telephone number of the inmate messaging device, and/or the device password selected by the inmate, account funding information such as account balance and/or how the account balance was funded (e.g., funding transactions), and/or text message information such as messages sent, messages received, messages rejected, the content of sent/received/rejected messages, telephone numbers associated with mobile devices messages are sent to/received from by the inmate messaging device, revenue information, usage reports, among other communication information.

Method 730 can include returning the active predetermined and unique telephone number to the group of reserved predetermined and unique telephone numbers as a returned telephone number. For example, an inmate who has been assigned an inmate messaging device may be scheduled to leave the incarceration facility. For instance, the inmate may be transferred (e.g., to a different incarceration facility) or released (e.g., parole, sentence has been served, etc.) In response, the active predetermined and unique telephone number associated with the Wi-Fi radio of the leaving inmate's messaging device can be returned to the group of reserved predetermined and unique telephone numbers. The returned telephone number may be associated with a different inmate messaging device at a later time.

Method 730 can include refraining from associating the returned telephone number with a different inmate messaging device for a predetermined period of time. For example, an inmate with the active predetermined and unique telephone number 999-555-1001 may be scheduled to be released from the incarceration facility and as a result, the telephone number 999-555-1001 may be returned to the group of reserved predetermined and unique telephone numbers. The telephone number 999-555-1001 may not be associated with a different inmate messaging device for a period of two months. Refraining from associating the returned telephone number 999-555-1001 for a predetermined period of time can help to ensure a different inmate who is eventually assigned an inmate messaging device with the active predetermined and unique telephone number 999-555-1001 does not receive text messages from customers who may have been communicating with the previous inmate. Further, the different inmate can avoid incurring costs for text messages which that inmate may not want to receive.

As used herein, "logic" is an alternative or additional processing resource to perform a particular action and/or element described herein. Logic can include hardware. The hardware can include processing resources such as circuitry, which are distinct from machine-readable instructions on a machine readable media. Further, as used herein, "a" can refer to one or more such things.

The above specification, examples and data provide a description of the method and applications, and use of the system and method of the disclosure. Since many examples can be made without departing from the spirit and scope of the system and method of the disclosure, this specification merely sets forth some of the many possible example configurations and implementations.

What is claimed is:

1. An inmate text communication system, comprising:
a mobile device;
a server; and
an inmate messaging device including a Wi-Fi radio that communicates a text message through the server with the mobile device via the Wi-Fi radio, wherein the Wi-Fi radio is associated with an active predetermined and unique telephone number selected from a group of reserved predetermined and unique telephone numbers, wherein the inmate messaging device is configured to accept or reject a text message sent from the mobile device to the inmate messaging device in response to an input to a user interface of the inmate messaging device.

2. The system of claim 1, wherein the inmate messaging device does not include a cellular radio.

3. The system of claim 1, wherein the text message includes at least one of:
a short message service (SMS) message; and
a multimedia messaging service (MMS) message.

4. The system of claim 1, wherein the server is configured to prevent communication of the text message in response to a telephone number of the mobile device being included in a list of restricted mobile devices.

5. The system of claim 1, wherein the server is configured to store communication information corresponding to the communicated text message.

6. The system of claim 5, wherein the communication information is at least one of searchable communication information and exportable communication information.

7. The system of claim 1, wherein communicating the text message further includes sending a text message, receiving a text message, or a combination thereof.

8. The system of claim 1, wherein the server is configured to prevent the inmate messaging device from communicating the text message at a predetermined time.

9. The system of claim 1, wherein the active predetermined and unique telephone number is associated with a user of the inmate messaging device.

10. A non-transitory machine-readable medium storing instructions executable by a processing resource to:
communicate a text message with a mobile device via a Wi-Fi radio of an inmate messaging device, wherein the Wi-Fi radio of the inmate messaging device is associated with an active predetermined and unique telephone number selected from a group of reserved predetermined and unique telephone numbers, wherein the inmate messaging device does not include a cellular radio; and
accept or reject a text message sent from the mobile device to the inmate messaging device in response to an input to a user interface of the inmate messaging device.

11. The non-transitory medium of claim 10, including instructions to communicate the text message via the Internet.

12. The non-transitory medium of claim 10, including instructions to communicate the text message in response to an account associated with the inmate messaging device having a sufficient monetary balance.

13. The non-transitory medium of claim 10, including instructions to unlock the inmate messaging device in response to receiving a device password associated with the inmate messaging device and communicate the text message without receipt of an application level password in response to receiving an input to the inmate messaging device.

14. The non-transitory medium of claim 10, including instructions to block the mobile device from communicating future text messages in response to a user input.

15. A method, comprising:
communicating, via a server, a text message between a Wi-Fi radio of an inmate messaging device and a mobile device without use of a cellular radio by the inmate messaging device, wherein the Wi-Fi radio of the inmate messaging device is associated with an active predetermined and unique telephone number selected from a group of reserved predetermined and unique telephone numbers;
accepting a text message sent from the mobile device to the inmate messaging device in response to an input provided to a user interface of the inmate messaging device prior to displaying message content of the accepted text message; and
rejecting a text message sent from the mobile device to the inmate messaging device in response to an input provided to the user interface of the inmate messaging device without displaying message content of the rejected text message.

16. The method of claim 15, wherein the method includes funding an account associated with the inmate messaging device by receiving, via the user interface of the inmate messaging device, funding via a funding mechanism.

17. The method of claim 15, wherein the method includes funding an account associated with the inmate messaging device by communicating, via the Wi-Fi radio of the inmate messaging device, a predefined funding request text message to the mobile device.

18. The method of claim 15, wherein the method includes returning the active predetermined and unique telephone number to the group of reserved predetermined and unique telephone numbers as a returned telephone number.

19. The method of claim 18, wherein the method includes refraining from associating the returned telephone number with a different inmate messaging device for a predetermined period of time.

20. The system of claim 1, wherein the inmate messaging device is configured to display at least one of:
a name of an inmate associated with the inmate messaging device via the user interface of the inmate messaging device;
an account history, wherein the account history includes an account balance, funding transactions, messaging transactions, rental fees, credits, or combination thereof; display; and
contacts the inmate messaging device can communicate a text with.

* * * * *